United States Patent
Doi et al.

(10) Patent No.: US 12,368,397 B2
(45) Date of Patent: Jul. 22, 2025

(54) MOTOR CONTROL DEVICE

(71) Applicant: OMRON Corporation, Kyoto (JP)

(72) Inventors: Masashi Doi, Kyoto (JP); Takeo Nishikawa, Kyoto (JP); Takeshi Ashida, Kyoto (JP); Hiroyuki Tokusaki, Kyoto (JP); Liangyu Shen, Kyoto (JP)

(73) Assignee: OMRON CORPORATION, Kyoto (JP)

(*) Notice: Subject to any disclaimer, the term of this patent is extended or adjusted under 35 U.S.C. 154(b) by 103 days.

(21) Appl. No.: 18/547,806

(22) PCT Filed: Dec. 20, 2021

(86) PCT No.: PCT/JP2021/047104
§ 371 (c)(1),
(2) Date: Aug. 24, 2023

(87) PCT Pub. No.: WO2022/185675
PCT Pub. Date: Sep. 9, 2022

(65) Prior Publication Data
US 2024/0136959 A1   Apr. 25, 2024
US 2024/0235437 A9   Jul. 11, 2024

(30) Foreign Application Priority Data

Mar. 1, 2021 (JP) ................ 2021-031368

(51) Int. Cl.
*H02P 5/74* (2006.01)

(52) U.S. Cl.
CPC ............ *H02P 5/74* (2013.01); *H02P 2209/07* (2013.01)

(58) Field of Classification Search
CPC ...... H02P 5/74; H02P 2209/07; H02M 1/008; H02M 7/5395
See application file for complete search history.

(56) References Cited

U.S. PATENT DOCUMENTS 7,466,086 B2 * 12/2008 Kiuchi .................. H02P 5/747
 318/52
8,278,865 B2 * 10/2012 Shimada ................ H02P 27/04
 318/807
(Continued)

FOREIGN PATENT DOCUMENTS

JP   H07222455 A    8/1995
JP   2011259546 A   12/2011
(Continued)

OTHER PUBLICATIONS

International Search Report issued in Intl. Appln. No. PCT/JP2021/047104 mailed Mar. 1, 2022. English translation provided.
(Continued)

*Primary Examiner* — Rina I Duda
(74) *Attorney, Agent, or Firm* — ROSSI, KIMMS & McDOWELL LLP

(57) ABSTRACT

A motor controller includes a plurality of inverters that supply power to a corresponding motor of a plurality of motors through pulse width modulation control, a direct current power supply that supplies power to the plurality of inverters, and a capacitor connected parallel to the direct current power supply. Each of the plurality of inverters is categorized into one of a plurality of groups based on a switching frequency. All inverters in each of the groups have corresponding carrier signals being triangular wave signals determined based on a reference frequency assigned to the group. At least one of the triangular wave signals has at least one of a frequency or a phase different from a frequency or a phase of another triangular wave signal of the triangular wave signals.

5 Claims, 6 Drawing Sheets

(56) References Cited

U.S. PATENT DOCUMENTS

| | | | | |
|---|---|---|---|---|
| 8,860,335 B2* | 10/2014 | Gries | ...................... | H02M 1/12 |
| | | | | 318/53 |
| 2009/0066286 A1* | 3/2009 | Gunji | ................... | B62D 5/0487 |
| | | | | 318/490 |
| 2011/0080131 A1* | 4/2011 | Shimada | ................. | H02P 27/04 |
| | | | | 307/31 |
| 2013/0026955 A1* | 1/2013 | Kikunaga | ............. | H02P 27/085 |
| | | | | 318/51 |
| 2013/0057061 A1* | 3/2013 | Shiomi | ................... | B60R 16/03 |
| | | | | 307/9.1 |
| 2013/0257328 A1* | 10/2013 | Arai | ...................... | H02P 29/032 |
| | | | | 318/400.22 |
| 2017/0264229 A1* | 9/2017 | Murata | ..................... | H02P 3/22 |

FOREIGN PATENT DOCUMENTS

| | | |
|---|---|---|
| JP | 2012222847 A | 11/2012 |
| JP | 2013059181 A | 3/2013 |

OTHER PUBLICATIONS

Written Opinion issued in Intl. Appln. No. PCT/JP2021/047104 mailed Mar. 1, 2022. English translation provided.

* cited by examiner

FIG. 3A

| Inverter | 41₁ | 41₂ | 41₃ | 41₄ | 41₅ | 41₆ | 41₇ |
|---|---|---|---|---|---|---|---|
| Model | A | B | C | D | D | E | E |
| Reference frequency (Group) | fa (Group 1) | | | fb (Group 2) | | fc (Group 3) | |
| Frequency combination | fa-fr/2 | fa-fr/2, fa, fa+fr/2 | fa+fr/2 | fb-fr/2 | fb-fr/2, fb+fr/2 | fc-fr/2 | fc-fr/2, fc+fr/2 |
| Initial frequency | fa-fr/2 | fa | fa+fr/2 | fb-fr/2 | fb+fr/2 | fc-fr/2 | fc+fr/2 |

FIG. 3B

| Inverter | 41₁ | 41₂ | 41₃ | 41₄ | 41₅ | 41₆ | 41₇ |
|---|---|---|---|---|---|---|---|
| Model | A | B | C | D | D | E | E |
| Reference frequency (Group) | fa (Group 1) | | | fb (Group 2) | | fc (Group 3) | |
| Initial phase | 0 degrees | 60 degrees | 120 degrees | 0 degrees | 90 degrees | 0 degrees | 90 degrees |

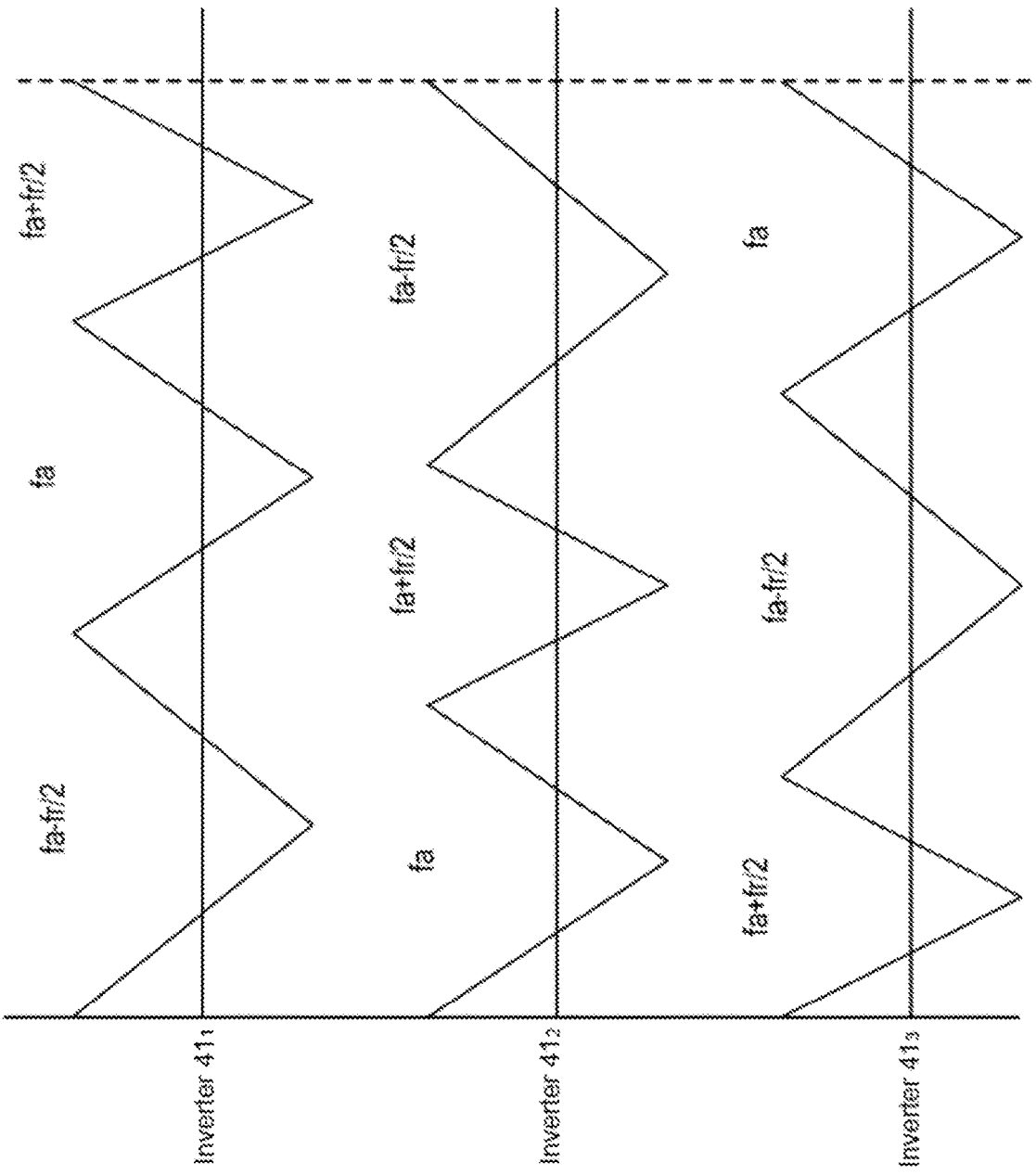

MOTOR CONTROL DEVICE

FIELD

The present invention relates to a motor controller.

BACKGROUND

A known servo power supply system may include a single alternating current power supply (AC power supply) to supply, to multiple motors, power adjusted based on the rotational speed of each motor. In this manner, the multiple motors receive power to operate the single system. However, this structure includes complicated wiring with many wires to connect the motors and the power supply. The structure also has many issues such as the use of thicker wires and easy generation of noise and heat.

Patent Literature 1 describes a technique for converting power from a single AC power supply to direct current (DC) and distributing the power from the single source to multiple inverters that control multiple motors. This reduces noise in feeding power and allows use of thinner wires. The technique described in Patent Literature 1 also uses triangular wave signals with phases shifted from one another for multiple inverters to perform pulse width modulation (PWM) control using triangular wave signals (triangular waves) as basic waveforms for PWM control. This reduces the likelihood of a capacitor connected parallel to the power supply being affected by ripple currents flowing through the capacitor.

CITATION LIST

Patent Literature

Patent Literature 1: Japanese Unexamined Patent Application Publication No. 2011-259546

SUMMARY

Technical Problem

The technique described in Patent Literature 1 for inverters all having switching elements with the same switching frequency uses triangular signals, as carrier signals, having phases different from one another to determine the switching frequency and switching timing to reduce ripple currents and thus to effectively reduce the effects of ripple currents. However, when the switching frequency of any of the inverters differs largely from the other inverters, the technique cannot sufficiently reduce ripple currents and thus cannot effectively reduce the effects of ripple currents by using triangular wave signals with different phases.

One or more aspects of the present invention are directed to a technique for reducing the effects of ripple currents when multiple inverters to supply power to multiple motors include an inverter with the switching frequency different largely from the switching frequency of the other inverters.

Solution to Problem

The technique according to one or more aspects of the present invention provides the structure below.

A motor controller according to one aspect of the present invention controls an operation of a plurality of motors. The motor controller includes a plurality of inverters each including a switching element to supply power to a corresponding motor of the plurality of motors through pulse width modulation control based on a carrier signal indicating basic waveforms of the pulse width modulation control, a direct current power supply that supplies power to the plurality of inverters, and a capacitor connected parallel to the direct current power supply. Each of the plurality of inverters is assigned with a reference frequency based on a switching frequency of the inverter. The reference frequency is associated with the carrier signal for the pulse width modulation control. Each of the plurality of inverters is categorized into one of a plurality of groups based on the reference frequency assigned to the inverter. All inverters in each of the plurality of groups have corresponding carrier signals being triangular wave signals determined based on the reference frequency assigned to the group At least one of the carrier signals corresponding to all the inverters in each of the plurality of groups has at least one of a frequency or a phase different from a frequency or a phase of another carrier signal of the carrier signals.

In the above structure, each of the groups of inverters based on the reference frequency has carrier signals (triangular wave signals) with different frequencies or phases to allow the switching elements in each group to switch on and off at different timings. This reduces the peak value of ripple currents in the capacitor and thus reduces the effects of ripple currents in the motor controller.

In the motor controller, the carrier signal for each of the plurality of inverters may be a triangular wave signal with a frequency determined based on the reference frequency of a predetermined group including the inverter. The frequency of the carrier signal for each of the plurality of inverters may be different from a frequency for every other inverter in the predetermined group. With carrier signals having different frequencies in a group as described above, unlike with carrier signals having different phases in a group, the frequency change patterns of the carrier signals can be controlled to synchronize the carrier signals.

In the motor controller, carrier signals in each of the plurality of groups may have a frequency variation smaller than a difference in the reference frequency between the group and a group with a reference frequency closest to a reference frequency of the group. A group with a lower reference frequency of the two groups may have a highest frequency of carrier signals lower than a lowest frequency of carrier signals for the group with a higher reference frequency of the two groups. This allows the ranges of carrier signal frequencies to be different between two adjacent groups. Thus, switching elements in different groups have different frequencies for switching between the on and off states. This reduces the peak value of ripple currents in the capacitor and thus reduces the effects of ripple currents in the motor controller.

In the motor controller, the carrier signal for each of the plurality of inverters and the carrier signal for another inverter in the group including the inverter may switch between frequencies in a predetermined combination in sequences different from each other. This allows carrier signals for the same group to synchronize with one another in every period of the same number of cycles as the number of frequencies in a predetermined combination of frequencies. The peaks of carrier signals thus do not coincide with one another except at the time of synchronization. This reduces the peak value of ripple currents in the capacitor while allowing carrier signals to be synchronized with one another in each group.

In the motor controller, all frequencies in the predetermined combination may be shifted by a predetermined value being a frequency variation of carrier signals in a group corresponding to the predetermined combination divided by a number obtained by subtracting 1 from the number of inverters in the group. This allows carrier signal frequencies in a group to differ largely from one another, thus more effectively reducing the effects of ripple currents in the motor controller.

In the motor controller, the reference frequency of each of the plurality of inverters may be the same as the reference frequency of all of the other inverters in a predetermined group including the inverter.

In the motor controller, the carrier signal for each of the plurality of inverters may be a triangular wave signal with a frequency determined based on the reference frequency of a predetermined group including the inverter. The carrier signal may have a phase different from a phase of the carrier signal for every other inverter in the predetermined group.

In the motor controller, the carrier signals for all the inverters in the predetermined group may have phases shifted by 180 degrees divided by the number of inverters in the predetermined group. This allows carrier signal phases in a group to differ largely from one another, thus more effectively reducing the effects of ripple currents in the motor controller. More specifically, this allows second harmonic waves in switching ripples to cancel each other, thus more effectively reducing the effects of ripple currents in the motor controller.

One or more aspects of the present invention may be directed to an apparatus including at least one of the above elements, or to a controller, a control system, a motor system, or a motor device. One or more aspects of the present invention may also be directed to a control method or a setting method including at least one of the above processes. One or more aspects of the present invention may be directed to a program for implementing any of these methods or to a non-transitory storage medium storing the program. The above elements and processes may be combined with one another in any possible manner to form one or more aspects of the present invention.

Advantageous Effects

The technique according to the above aspects of the present invention reduces the effects of ripple currents when multiple inverters to supply power to multiple motors include an inverter with the switching frequency different largely from the switching frequency of the other inverters.

BRIEF DESCRIPTION OF THE DRAWINGS

FIG. 3A is a table describing frequency change control for triangular wave signals in the first embodiment, and FIG. 3B is a table describing phase control for the triangular wave signals in the first embodiment.

FIG. 4 is a graph showing triangular wave signals with frequency change control in the first embodiment.

DETAILED DESCRIPTION

Embodiments of the present invention will now be described with reference to the drawings.

Example Use

Figure 1:
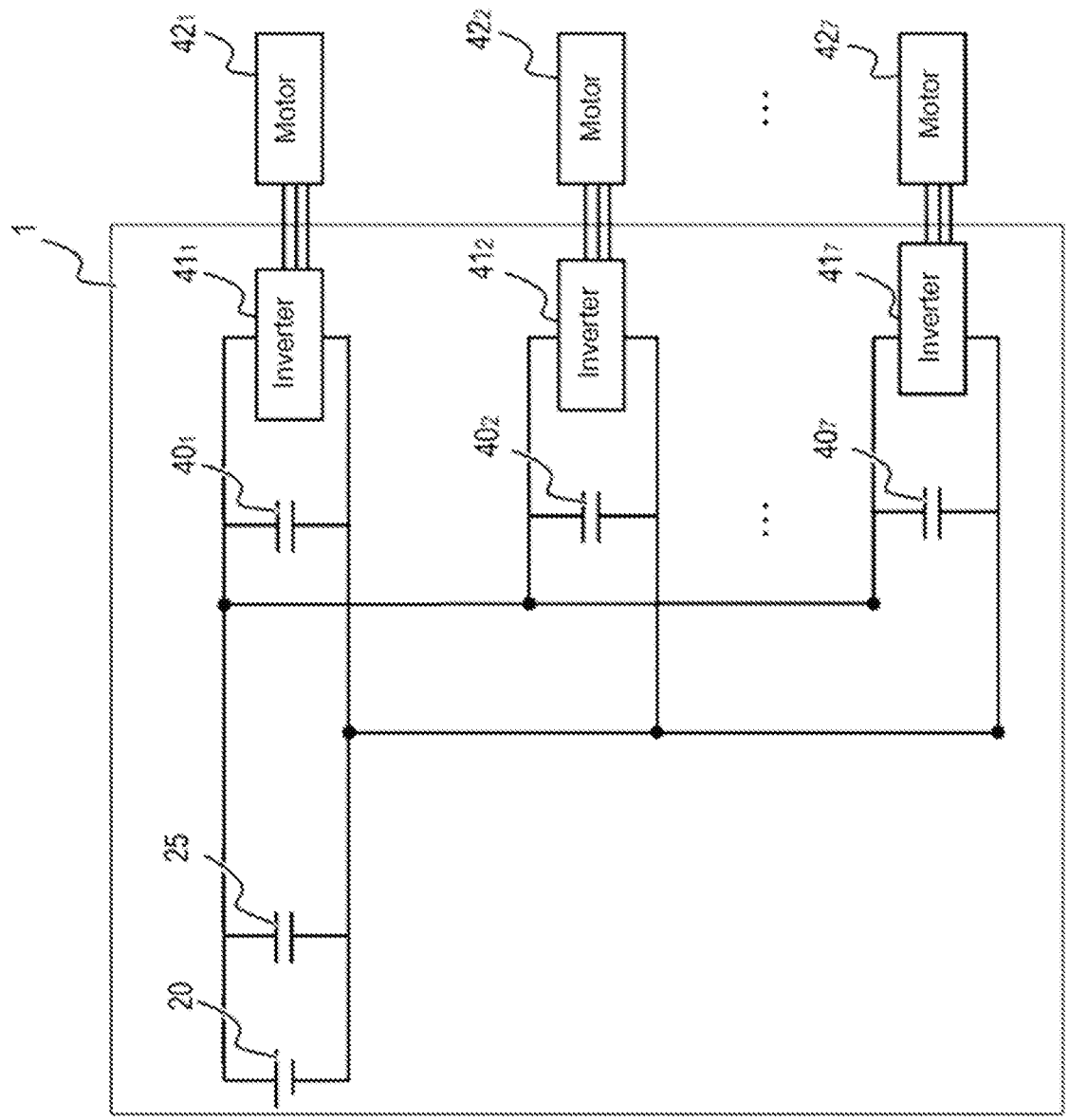
FIG. 1 is a schematic diagram of a motor controller according to a first embodiment.
Figure 2:
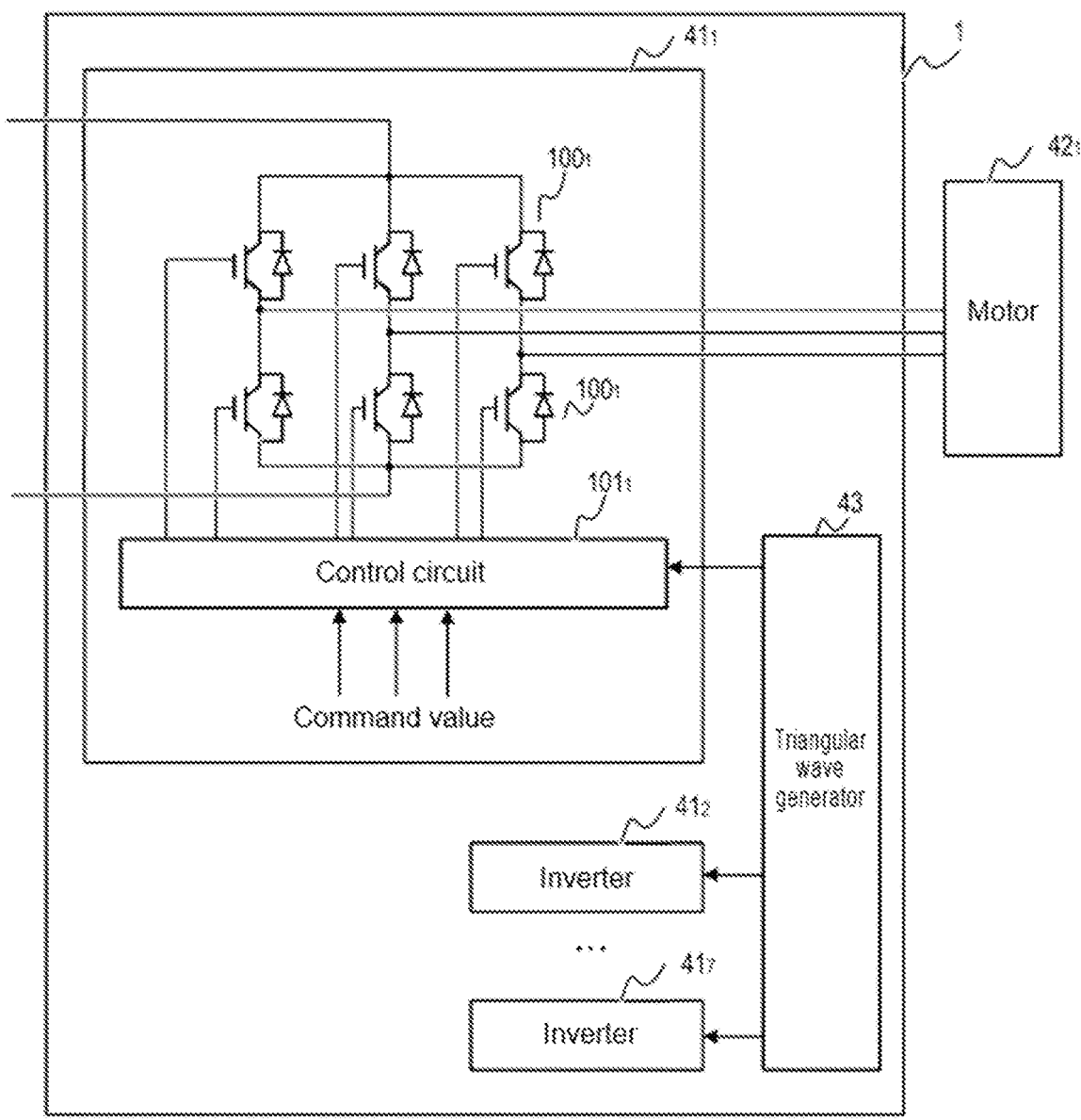
FIG. 2 is a schematic diagram of the motor controller according to the first embodiment.

A motor controller 1 that supplies power (alternating current or AC power) to multiple motors 42 as shown in FIGS. 1 and 2 will now be described. In the motor controller 1, inverters 41 perform pulse width modulation (PWM) control (control of an output voltage to be output to the multiple motors 42) by turning on and off switching elements 100 in the inverters 41. Basic waveforms for PWM control performed by the inverters 41 are determined by triangular wave signals (triangular waves) generated by a triangular wave generator 43. In the example described below, the motor controller 1 includes the inverters 41 in groups based on the switching frequencies (reference frequencies) of the switching elements 100, with phases or frequencies (frequency change patterns) of triangular wave signals differing from one another between the inverters 41 in the same group. In other words, each of the inverters 41 performs PWM control based on a triangular wave signal differing in phase or frequency from triangular wave signals used by the other inverters 41 in the same group. This causes the switching elements 100 in each of the inverters 41 to be switched between the on and off states at timings different from the switching elements 100 in the other inverters 41 in the same group, thus reducing the peak value of ripple currents in a capacitor 25 connected parallel to a power supply 20.

First Embodiment

[Structure of Motor Controller]

Referring to FIGS. 1 and 2, the structure of the motor controller 1 to control the motors 42 (motors $42_1$ to $42_7$) according to the present embodiment will be described. The motor controller 1 includes the power supply 20, the capacitor 25, capacitors $40_1$ to $40_7$, inverters $41_1$ to $41_7$, and the triangular wave generator 43 (refer to FIG. 2). The motor controller 1 shown in FIGS. 1 and 2 includes seven inverters 41, seven capacitors 40, and seven motors 42, but these components of the motor controller 1 may be in any equal number. The structure including the motor controller 1 and the motors 42 may be defined as a motor system.

The power supply 20 provides direct current (DC) power (or DC) to the inverters $41_1$ to $41_7$. The power supply 20 includes a grid (AC power supply) and a converter (specifically, a DC power supply) that converts power from the grid to DC power.

The capacitor 25 is connected parallel to the power supply 20. The capacitor 25 combined with the power supply 20 supplies DC power to the inverters $41_1$ to $41_7$ connected parallel to one another. The capacitor 25 maintains a voltage applied to the inverters $41_1$ to $41_7$ at a substantially constant level, thus reducing the likelihood of a sudden (momentary) fluctuation in the voltage applied to the inverters $41_1$ to $41_7$ (overvoltage or undervoltage). In the capacitor 25, a current called a ripple current occurs in response to changes in the operation of the inverters $41_1$ to $41_7$. A large ripple current causes a large temperature rise in the capacitor 25, thus adversely affecting the service life of the capacitor 25 and the motor controller 1. The structure according to the present embodiment reduces the peak value of ripple currents.

Each of the capacitors $40_1$ to $40_7$ is a smoothing capacitor that reduces the pulsation of DC power and can also store DC power.

The inverter $41_X$ (X=1 to 7) controls the motor $42_X$ with AC power with a frequency used by the motor $42_X$ generated from the input power. The inverters $41_1$ to $41_7$ are connected to the power supply 20 and the capacitor 25 in parallel to one another. As shown in FIG. 2, the inverter 41$_X$ includes six switching elements 100$_X$ and a control circuit 101$_X$.

The switching elements 100$_X$ are turned on and off based on a PWM control signal from the control circuit 101$_X$. PWM control is thus performed to control AC power to be supplied from the inverter 41$_X$ to the motor 42$_X$. The frequency at which the switching elements 100$_X$ are switched on and off (switching frequency) is predetermined (fixed) for the model of the inverter 41$_X$. More specifically, the motor 42$_X$ with a higher capacity have a lower switching frequency.

The control circuit 101$_X$ compares a triangular wave signal output from the triangular wave generator 43 with a command value for the three-phase voltage of the motor 42$_X$ input from an operation controller (not shown) to generate PWM control signals to control the switching elements 100$_X$ between the on and off states. The control circuit 101$_X$ outputs the generated PWM control signals to the six switching elements 100$_X$.

The triangular wave generator 43 generates triangular wave signals as basic waveforms for PWM control performed by each inverter 41. The triangular wave signals are carrier signals (carrier waves) that are the basic waves used to transmit information. The triangular wave generator 43 then outputs the triangular wave signals to the inverters 41$_1$ to 41$_7$ (control circuits 101$_1$ to 101$_7$). In the present embodiment, the inverters 41$_1$ to 41$_7$ are in groups each with a different reference frequency. The triangular wave generator 43 controls the triangular wave signals for each group to control ripple currents in the capacitor 25. More specifically, a reference frequency is assigned to each of the inverters 41$_1$ to 41$_7$ based on the switching frequency of each inverter. In other words, the inverters 41 with similar switching frequencies (switching frequencies in the same category) are assigned with the same reference frequency. The inverters 41$_1$ to 41$_7$ are then divided into groups based on the reference frequency. The triangular wave generator 43 controls the triangular wave signals for each group based on the reference frequency assigned to that group. The reference frequency assigned to a group may be the same as the switching frequency of the inverters 41 in the group, or the reference frequency may differ from the switching frequency.

In the examples shown in FIGS. 3A and 3B, a reference frequency fa is for inverter models A to C, a reference frequency fb is for a model D, and a reference frequency fc is for a model E. The inverter 41$_1$ is a model A, the inverter 41$_2$ is a model B, the inverter 41$_3$ is a model C, each of the inverters 41$_4$ and 41$_5$ is a model D, and each of the inverters 41$_6$ and 41$_7$ is a model E. The inverters 41$_1$ to 41$_3$ with the reference frequency fa are categorized as group 1, the inverters 41$_4$ and 41$_5$ with the reference frequency fb are categorized as group 2, and the inverters 41$_6$ and 41$_7$ with the reference frequency fc are categorized as group 3. These groups are predefined in the triangular wave generator 43.

(Frequency-Based Control of Triangular Wave Signals)

A method for controlling ripple currents performed by the triangular wave generator 43 controlling triangular wave signals based on frequency will now be described. The triangular wave generator 43 provides the inverters 41 in each group having the same reference frequency with triangular wave signals having frequency change patterns (frequencies) different from one another in the group. For group 1, for example, the triangular wave generator 43 determines a combination of three (corresponding to the number of inverters 41 in the group 1) frequencies. For example, the triangular wave generator 43 determines a combination of frequencies based on the frequency range between fa−fr/2 and fa+fr/2, which is an allowable range for a variable frequency fr (a variation) centered on fa as the reference frequency assigned to group 1. More specifically, the triangular wave generator 43 determines a combination of frequencies including fa, fa−fr/2, and fa+fr/2. The frequencies in this combination are, for example, shifted by the value of the variable frequency fr divided by 2, where 2 is obtained by subtracting 1 from 3, or the number of inverters in the group. The frequencies in the combination are not limited to these, but may each be any value within the frequency range between fa−fr/2 and fa+fr/2. For example, the reference frequency fa is 8 kHz, and the variable frequency fr is 200 Hz. The triangular wave generator 43 then generates triangular wave signals for the inverters 41$_1$ to 41$_3$, with the triangular wave signals switching between the frequencies included in the combination in different sequences. The number of frequencies included in the combination may not always be equal to the number of inverters 41 in the group, but may be any number greater than the number of inverters 41 in the group.

As shown in FIG. 4, for example, the triangular wave generator 43 generates, as a triangular wave signal output to the inverter 41$_1$, a triangular wave signal switching between frequencies fa−fr/2, fa, and fa+fr/2 in this sequence. The triangular wave generator 43 generates, as a triangular wave signal output to the inverter 41$_2$, a triangular wave signal switching between frequencies fa, fa+fr/2, and fa−fr/2 in this sequence. The triangular wave generator 43 generates, as a triangular wave signal output to the inverter 41$_3$, a triangular wave signal switching between frequencies fa+fr/2, fa−fr/2, and fa in this sequence.

Triangular wave signals generated in this manner for group 1 are synchronized with one another once in every period of the same number of cycles as the number of frequencies in the frequency set (three, or the number of inverters 41 in group 1). The peaks of the three triangular wave signals do not coincide with one another except at the time of synchronization. Thus, the switching elements 100 in the inverters 41$_1$ to 41$_3$ switch on and off at different timings except at the time of synchronization, reducing the peak value (maximum value) of ripple currents in the capacitor 25.

For the other groups 2 and 3, as shown in FIG. 3A, the triangular wave generator 43 also determines a combination of frequencies and generates triangular wave signals for the inverters in each group for switching between these frequencies in sequences different from one another. The triangular wave generator 43 may determine the variable frequency fr to cause the frequency range of each group, in which a combination of frequencies is defined, not to overlap the frequency range of any other group with a different reference frequency. In other words, the frequency variation in triangular wave signals in each group may be smaller than a difference between the reference frequency of the group and the reference frequency of the closest group. In this case, the highest frequency of the triangular wave signals in the group with a lower reference frequency of these two groups may be lower than the lowest frequency of the triangular wave signals in the group with a higher reference frequency.

In the experiments conducted by the inventors with a reference frequency (switching frequency) fa of 8 kHz and a variable frequency fr of 200 Hz, the peak-to-peak ripple amplitude in the frequency band with the largest switching ripple amplitudes is about 15% smaller when the above inverters 41$_1$ to 41$_3$ alone are operated with the triangular wave signals controlled as described in the present embodiment than when no frequency change control is performed in the above manner. Controlling the triangular wave signals as described in the present embodiment thus reduces the peak value of ripple currents in the motor controller 1.

(Phase-Based Control of Triangular Wave Signals)

Figure 5:
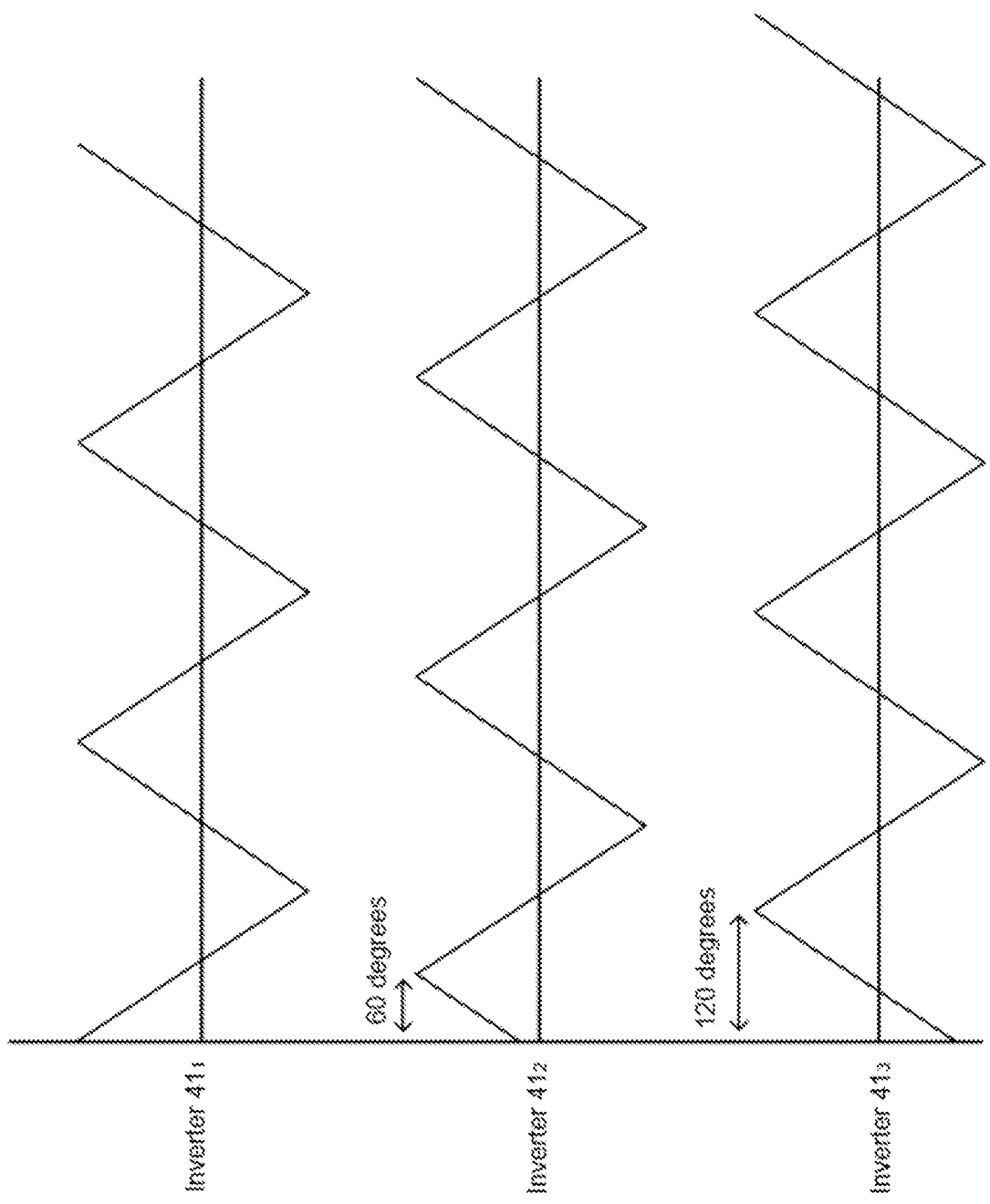
FIG. 5 is a graph showing triangular wave signals with phase control in the first embodiment.

A method for controlling ripple currents performed by the triangular wave generator 43 controlling triangular wave signals based on phases will now be described. The triangular wave generator 43 provides, to the inverters 41 in each group with the same reference frequency, triangular wave signals with phases shifted from one another as shown in FIG. 3B. For group 1, for example, the triangular wave generator 43 generates triangular wave signals for the inverters $41_1$ to $41_3$ at the same frequency (the frequency indicated by the reference frequency) with adjacent phases shifted by 60 degrees as shown in FIG. 5. In this case, the phases are shifted by, for example, 180 degrees divided by n, where n is the number of inverters 41 in the same group. The numerator is not limited to 180 degrees, but may be any angle, such as 360 degrees.

More specifically, as shown in FIG. 5, with reference to the triangular wave signal for the inverter $41_1$, the triangular wave generator 43 shifts the phase of the triangular wave signal for the inverter $41_2$ by 60 degrees from the triangular wave signal for the inverter $41_1$, and shifts the phase of the triangular wave signal for the inverter $41_2$ by 120 degrees from the triangular wave signal for the inverter $41_1$.

In the present embodiment, with the phases controlled for each group, unlike with the technique described in Patent Literature 1 described above, not all of the triangular wave signals have phases different from one another. More specifically, every group uses a triangular wave signal with a phase of 0 degrees.

In the experiments conducted by the inventors with a reference frequency fa of 8 kHz and a variable frequency fr of 200 Hz, the peak-to-peak ripple amplitude in the frequency band with the largest switching ripple amplitudes is about 95% smaller when the above inverters $41_1$ to $41_3$ are operated with phases of the triangular wave signals controlled as described in the present embodiment than when no phase control is performed in the above manner. This thus reduces adverse effects of ripple currents in the motor controller 1.

In the examples described above, each of the triangular wave signals output to a group with the same reference frequency either has a frequency change pattern or a phase different from the pattern or the phase of another signal. However, not every triangular wave signal output to a single group with the same reference frequency may have a frequency change pattern or a phase different from the pattern or the phase of another signal. In some embodiments, at least one of the triangular wave signals output to a single group with the same reference frequency may have a frequency change pattern or a phase different from the pattern or the phase of another signal.

In another example, each of the triangular wave signals output to a single group with the same reference frequency may have a frequency change pattern and a phase both different from the pattern and the phase of another signal. For group 1, for example, triangular wave signals that switch between the frequencies in a combination in sequences different from one another may be generated with different phases.

Instead of the triangular wave generator 43, each of the inverters $41_1$ to $41_7$ may perform a process to assign different frequency change patterns or phases to triangular wave signals. In this case, the triangular wave generator 43 may output the same triangular wave signal to the multiple inverters 41 in the same group. The control circuit $101_1$ may then generate (through conversion), based on, for example, the triangular wave signal obtained from the triangular wave generator 43, a triangular wave signal for PWM control of the switching element $100_1$ with a frequency change pattern different from the patterns of the triangular wave signals for PWM control of the switching element $100_2$ and the switching element $100_3$ in the same group.

In the above examples, the inverters $41_1$ to $41_7$ are grouped by reference frequency. The inverters 41 with the same reference frequency may further be divided into multiple subgroups. This also allows triangular wave signals to have different frequencies or phases in each group, thus reducing the peak value of ripple currents.

The scope of the claims is construed without being limited to the features described in the embodiments described above. The scope of the claims is construed to include the scope understandable by those skilled in the art to solve intended issues in view of the common technical knowledge at the time of filing.

APPENDIX

A motor controller (1) for controlling an operation of a plurality of motors (42), the motor controller (1) comprising:
  a plurality of inverters (41), each of the plurality of inverters (41) including a switching element (100) to supply power to a corresponding motor (42) of the plurality of motors (42) through pulse width modulation control based on a carrier signal;
  a direct current power supply (20) configured to supply power to the plurality of inverters (41); and
  a capacitor (25) connected parallel to the direct current power supply (20),
  wherein each of the plurality of inverters (41) is assigned with a reference frequency based on a switching frequency of the inverter (41), and the reference frequency is associated with the carrier signal for the pulse width modulation control,
  each of the plurality of inverters (41) is categorized into one of a plurality of groups based on the reference frequency assigned to the inverter (41), and
  all inverters (41) in each of the groups have corresponding carrier signals being triangular wave signals determined based on the reference frequency assigned to the group, and at least one of the carrier signals corresponding to all the inverters (41) in each of the plurality of groups has at least one of a frequency or a phase different from a frequency or a phase of another carrier signal of the carrier signals.

DESCRIPTION OF SYMBOLS

1: motor controller, 20: power supply, 25: capacitor, 40: capacitor, 41: inverter, 42: motor, 43: triangular wave generator, 100: switching element, 101: control circuit

The invention claimed is:
1. A motor controller for controlling an operation of a plurality of motors, the motor controller comprising:
  a plurality of inverters, each of the plurality of inverters including a switching element to supply power to a corresponding motor of the plurality of motors through pulse width modulation control based on a carrier signal;

a direct current power supply configured to supply power to the plurality of inverters; and a capacitor connected parallel to the direct current power supply, wherein each of the plurality of inverters is assigned with a reference frequency based on a switching frequency of the inverter, and the reference frequency is associated with the carrier signal for the pulse width modulation control, each of the plurality of inverters is categorized into one of a plurality of groups based on the reference frequency assigned to the inverter, and all inverters in each of the plurality of groups have corresponding carrier signals being triangular wave signals determined based on the reference frequency assigned to the group, and at least one of the carrier signals corresponding to all the inverters in each of the plurality of groups has a frequency different from a frequency of another carrier signal of the carrier signals, wherein carrier signals in each of the plurality of groups have a frequency variation smaller than a difference in the reference frequency between the group and a group with a reference frequency closest to a reference frequency of the group, and a group with a lower reference frequency of two groups has a highest frequency of carrier signals lower than a lowest frequency of carrier signals for a group with a higher reference frequency of the two groups.

2. The motor controller according to claim 1, wherein
the carrier signal for each of the plurality of inverters is a triangular wave signal with a frequency determined based on the reference frequency of a predetermined group including the inverter, and the frequency of the carrier signal for each of the plurality of inverters is different from a frequency for every other inverter in the predetermined group.

3. The motor controller according to claim 1, wherein
the carrier signal for each of the plurality of inverters and the carrier signal for another inverter in the group including the inverter switch between frequencies in a predetermined combination in sequences different from each other.

4. The motor controller according to claim 3, wherein
all frequencies in the predetermined combination are shifted by a predetermined value being a frequency variation of carrier signals in a group corresponding to the predetermined combination divided by a number obtained by subtracting 1 from the number of inverters in the group.

5. The motor controller according to claim 1, wherein
the reference frequency of each of the plurality of inverters is the same as the reference frequency of all of the other inverters in a predetermined group including the inverter.

* * * * *